United States Patent [19]

McKinley et al.

[11] Patent Number: 4,511,477

[45] Date of Patent: Apr. 16, 1985

[54] PROCESS OF USING WATER-ABSORBENT AGENTS FOR LOW PH APPLICATIONS

[75] Inventors: Mark J. McKinley, Linwood; Jim W. Sanner, Midland, both of Mich.

[73] Assignee: The Dow Chemical Company, Midland, Mich.

[21] Appl. No.: 542,873

[22] Filed: Oct. 17, 1983

[51] Int. Cl.$^3$ .................. B01D 37/00; C02F 1/00
[52] U.S. Cl. .................. 210/689; 210/692; 252/194; 427/336; 428/500; 524/547
[58] Field of Search .............. 210/666, 689, 692, 728; 252/194; 427/336; 428/500; 524/547

[56] References Cited

U.S. PATENT DOCUMENTS

| | | |
|---|---|---|
| 3,669,103 | 7/1972 | Harper et al. ............... 128/156 |
| 3,670,731 | 7/1972 | Harmon . | |
| 4,028,233 | 7/1977 | Quentin et al. .............. 210/666 |
| 4,090,013 | 5/1978 | Ganslaw et al. . | |
| 4,117,184 | 9/1978 | Erickson et al. ............ 428/340 X |
| 4,132,695 | 1/1979 | Burkholder .................. 524/547 |
| 4,134,863 | 1/1979 | Fanta et al. . | |
| 4,194,998 | 3/1980 | Fanta et al. . | |
| 4,242,242 | 12/1980 | Allen . | |
| 4,293,609 | 10/1981 | Erickson ..................... 428/246 |

*Primary Examiner*—Leland A. Sebastian

[57] ABSTRACT

A process for absorbing water containing relatively large amount of acid comprises contacting an aqueous medium with a rapidly water-swellable polymer comprising an alkali metal sulfonic acid salt containing polyelectrolyte. For example, a crosslinked polymer containing polymerized acrylamide and sodium 2-acrylamide-2-methylpropane sulfonate can be used to remove acidic water from fuels, battery casings, etc.

7 Claims, No Drawings

4,511,477

PROCESS OF USING WATER-ABSORBENT AGENTS FOR LOW PH APPLICATIONS

BACKGROUND OF THE INVENTION

The present invention relates to polymeric agents which are useful as water-absorbents, and in particular, to polymeric agents which are useful in removing water from numerous systems.

Water-swellable polymers have found various uses as absorbents for water. Examples of such polymers are disclosed in U.S. Pat. Nos. 3,926,891; 4,190,562 and 4,293,609. Unfortunately, such known water-swellable polymers are either non-ionic water-swellable polymers, or polyanionic water-swellable polymers containing anions of weak acids such as carboxylic acids. The weakly acidic groups only function in the ionic form when the pH of the system is above the pK of the acidic group. Thus, the known water-swellable polymers have not been effective in applications in which the pH is below about 4.

In view of the deficiencies of the prior art, it would be highly desirable to provide a means for effectively absorbing an aqueous medium which is acidic in nature.

SUMMARY OF THE INVENTION

The present invention is an improved process for effectively absorbing water in the form of an aqueous medium or moisture having a pH of less than about 4 which process comprises contacting said aqueous medium with a water-swellable polymer comprising an alkali metal sulfonic acid salt containing polyelectrolyte which is crosslinked in an amount sufficient to provide swellability to said polyelectrolyte, wherein the amount of said sulfonic acid salt moieties in said polyelectrolyte is sufficient to provide water absorbent activity, wherein said sulfonic acid salt containing polyelectrolyte maintains an ionic form over a lower pH range than a swellable polyelectrolyte containing alkali metal carboxylic acid salt moieties having (1) a similar molecular weight and (2) a similar concentration of acid salt moieties to that of said alkali metal sulfonic acid salt polyelectrolyte, and wherein said sulfonic acid salt containing polyelectrolyte provides improved water absorbent capability over a lower pH range than said swellable polyelectrolyte containing alkali metal carboxylic acid salt moieties.

The process of this invention enables one to absorb aqueous solutions or moisture in a wide variety of applications, and is particularly useful in providing disposable absorbent articles where a means for increased absorbency and decreased bulk is desirable. Of particular interest are those situations where it is desirable to remove an acidic aqueous medium from fuels, hydraulic fluids, battery applications, and the like.

DETAILED DESCRIPTION OF THE INVENTION

Exemplary nonionic monomers suitably employed in the practice of this invention are those ethylenically unsaturated monomers that are sufficiently water-soluble to form at least a 5 weight percent solution when dissolved in water and readily undergo addition homopolymerization to form polymers that are water-soluble. Examples of such nonionic monomers include ethylenically unsaturated amides such as acrylamide, methacrylamide and fumaramide; their water-soluble N-substituted nonionic derivatives such as the N-methylol derivatives of acrylamide and methacrylamide as well as the N-methyl and N,N-dimethyl derivatives of acrylamide and methacrylamide; hydroxyalkyl esters of unsaturated carboxylic acids such as hydroxyethyl acrylate and hydroxypropyl acrylate; and the like. Of the foregoing nonionic monomers, the ethylenically unsaturated amides are preferred with acrylamide being especially preferred.

Suitable ethylenically unsaturated monomers containing sulfonic acid salt moieties are the water-soluble, ethylenically unsaturated sulfonate monomers including N-sulfoalkyl, $\alpha,\beta$-ethylenically unsaturated amides such as the alkali metal salts of 2-acrylamido-2-methylpropane sulfonic acid, 2-acrylamido propane sulfonic acid, and 2-acrylamido ethane sulfonic acid such as the sodium and potassium salts thereof, as well as the alkali metal salts of other such monomers listed in U.S. Pat. No. 3,692,673 which is hereby incorporated by reference; alkali metal salts of sulfoalkyl esters of unsaturated carboxylic acids such as 2-sulfoethyl methacrylate and other such sulfoalkyl esters as listed in U.S. Pat. No. 4,075,134 which is also incorporated by reference; alkali metal salts of the sulfoarylalkenes such as vinylbenzyl sulfonic acid and p-styrene sulfonic acid alkali metal salts of sulfoalkenes such as vinyl sulfonic acid; and the like. Of the foregoing sulfonate monomers, the alkali metal salts of sulfoalkyl derivatives of acrylamide and methacrylamide are preferred with those of acrylamide being especially preferred, particularly 2-acrylamido-2-methylpropane sulfonic acid (AMPS), 2-acrylamido-2-propane sulfonic acid. In the most preferred embodiments, the sulfo group is in the form of an alkali metal sulfonate salt such as sulfonate containing sodium or potassium sulfonate. It is also possible to employ said sulfonate containing monomers in preparing polymers in combination with the sulfonic acid forms of said monomers.

Also useful herein are the essentially nonionic alkyl acrylates and alkyl methacrylates which are disclosed in U.S. Pat. No. 4,293,609. It is also possible to employ other ethylenically unsaturated monomers such as omega hydroxyalkyl acrylates, as well as essentially anionic monomers such as acrylic acid, itaconic acid and maleic anhydride. Examples of omega hydroxyalkyl acrylates and ethylenically unsaturated carboxylic acids are disclosed in U.S. Pat. No. 4,293,609.

The polyvinyl crosslinking monomers copolymerized with the aforementioned ethylenically unsaturated water-soluble monomers include, for example, divinyl benzene, divinyl esters of polycarboxylic acid, diallyl esters of polycarboxylic acids, diallyl maleate, diallyl fumarate, divinyl adipate, glyceryl trimethylacrylate, diallyl succinate, divinyl ether, the divinyl esters of ethylene glycol or diethylene glycol diacrylate, polyethylene glycol diacrylates or methacrylates, and the like. Of the aforementioned polyvinyl crosslinking monomers, the most preferred is methylene bisacrylamide.

Polymers can also be crosslinked using techniques and agents disclosed in U.S. Pat. No. 4,293,609.

Polymers are prepared by using techniques known in the art for preparing water-soluble polymers. For example, polymerization is preferably carried out in aqueous medium in the presence of a small but effective amount of a water-soluble oxygen-containing catalyst at a temperature of about 80° F. to about 190° F. The resulting polymer is recovered from the aqueous medium, as by precipitation or drum drying, and can be subsequently ground to the desired particle size. The particle size should be fine enough to facilitate the dispersion of the polymer in water. Polymers are also prepared using polymerization techniques described in U.S. Pat. Nos. 3,284,393; and 4,376,850, which are incorporated herein by reference.

Molecular weights of the polymers of this invention can vary. Molecular weights typically range from about 100,000 to about 25 million. Most preferably, molecular weights range from about 1 million to about 5 million.

The polymers of this invention comprise sufficient monomer containing sulfonic acid salt moieties (i.e. sulfonate moieties) in order that the process for absorbing water can be achieved. For example, a polymer containing a sodium salt of 2-acrylamido-2-methylpropane sulfonic acid provides particularly good water absorbing character to the polymer at low pH. The polymers also comprise sufficient essentially nonionic monomer, which is preferably acrylamide, or an alkyl acrylate or alkyl methacrylate, in order that the polymer will provide sufficient gelling ability. That is, such monomer typically provides high molecular weight and good gelling ability to the polymer. The amount of polyvinyl crosslinking monomer which is employed will depend upon the type of crosslinker which is employed and the molecular weight of the polymer. The crosslinking monomer is employed to provide increased molecular weight and, hence, swelling character or increased viscosity to the polymer.

The polymers of this invention typically comprise 0 to about 95, preferably about 20 to about 70, most preferably about 30 to about 50, mole percent essentially nonionic ethylenically unsaturated monomer or combination of monomers, which are preferably acrylamide; from about 5 to about 100, preferably from about 30 to about 80, most preferably from about 50 to about 70, mole percent ethylenically unsaturated monomer containing a sulfonate moiety, which is preferably a sodium salt of 2-acrylamido-2-methyl propane sulfonic acid; and when crosslinking is provided by polyvinyl crosslinking agents, from about 100 to about 2,500 ppm, preferably from about 300 to about 1,000 ppm, most preferably from about 400 to about 700 ppm polyvinyl crosslinking monomer, which is preferably methylene bisacrylamide. It is understood that the amount of ethylenically unsaturated monomer containing sulfonic acid salt moieties within the polymer can vary depending on the desired behavior of the polymer. It is also understood that the essentially nonionic monomer within the polymer can undergo an amount of hydrolysis. That is, a portion of the essentially nonionic monomers can undergo hydrolysis. These polymers are particularly well suited for absorbing water from acidic formulations and are preferred.

Water absorbent polymers absorb several times their weight of an aqueous medium, preferably more than about 15 times their weight water. The amount of water which a particular polymer will absorb (i.e. water absorbent capability) is dependent upon the pH of the aqueous medium which is being absorbed, the molecular weight of the polymer, the amount of sulfonate moieties present in the polymer, and the amount of crosslinking.

The previously defined polymers can be employed in preparing articles such as laminates as are described in U.S. Pat. Nos. 3,980,663; 4,117,184; 4,293,609 and U.S. patent application Ser. No. 319,538, filed Nov. 9, 1981, which are incorporated herein by reference.

The water-swellable polymers which are used in the process of this invention can be employed in those applications in which water-absorbency is desirable. Most preferred are those applications wherein the pH of the aqueous medium is less than about 4, preferably less than about 3, most preferably from about 0.2 to about 2. Of particular interest are those applications wherein the removal of an aqueous medium having a low pH is desirable. For example, the process of this invention can be employed in providing covers and casings for batteries, or in fuel filter applications. That is, fuels or hydraulic fluids having high sulfur contents can introduce problems to internal machine parts upon the formation of sulfuric acid. The process of this invention can be employed, for example, in fuel filter applications in order to remove the acidic aqueous medium from such fuels or fluids. For example, the polymers of the invention can be mixed with clays, etc. to yield a water-absorbent material having good gel strength, and can be used as a fuel filter. Particularly desirable is that the polymers employed in the process of this invention are capable of swelling rapidly in order to absorb water at a rapid rate. In this regard, water is removed from a system quickly an efficiently.

The following examples are given for the purposes of illustrating the present invention and should not be construed as limiting its scope. Unless otherwise indicated, all parts and percentages are by weight.

EXAMPLE 1

The following general procedure is used to prepare the polymers used in the process of this invention and those used for comparison purposes.

Into a liter reaction kettle equipped with a stirrer, thermocouple, nitrogen inlet tube, gas vent and a heating mantle are charged the following with stirring:
(1) 60 g of a 50 percent solution of sodium 2-acrylamido-2-methylpropane sulfonate in water (pH=9–9.5)
(2) 140 g of a 50 percent solution of acrylamide in water (pH=5.5)
(3) 400 g of water
(4) 9 g of sodium carbonate.
(5) 0.5 g of methylene bisacrylamide Nitrogen is bubbled through the stirred solution for 1 hour. To this stirred solution are then added the following solutions:
(1) 2 ml of an aqueous solution of 10 percent pentasodium salt of (carboxymethylimino)bis(ethylenenitrilo)tetraacetic acid.
(2) 0.5 ml of an aqueous solution of 7 percent t-butyl hydroperoxide.
(3) 1 ml of an aqueous solution of 0.06 percent sodium borohydride ($NaBH_4$).

The temperature of the stirred solution rises from 25° C. to about 40° C. and is maintained at such temperature for 1 hour. The mixture is heated to 60° C. for another 90 minutes. The resulting aqueous solution of AAM/AMPS copolymer is removed and placed on a steam bath for 1 to 3 hours and drum dried to a white solid. The polymer contains 63 percent acrylamide, 7 percent sodium acrylate and 30 percent sodium 2-acrylamido-2-methylpropane sulfonate acid.

Polymers containing varying degrees of anionic character are prepared as described above. Each polymer is individually dissolved in water to provide a 0.25 g of polymer in 500 ml of water. The solution is allowed to stand for a period of 20 minutes. The resulting polymer gel is filtered through a 150 mesh nylon screen and is allowed to drip dry for 20 minutes. The gel is then weighed.

TABLE I

| Sample Number | Description[1] (weight percent monomers) | | | pH[2] | Capacity[3] (gm H$_2$O/ gm polymer) |
|---|---|---|---|---|---|
| | AAm | NaAAm | NaAMPS | | |
| 1 | 25 | — | 75 | 1 | 63.6 |
| 2 | 50 | — | 50 | 1 | 56.0 |
| 3 | 63 | 7 | 30 | 1 | 49.6 |
| 4 | 63 | 7 | 30 | 3 | 98.8 |
| 5 | 75 | 10 | 15 | 1 | 29.6 |
| 6 | 75 | 10 | 15 | 3 | 49.2 |
| C-1* | 70 | 30 | — | 1 | 20 |
| C-2* | 70 | 30 | — | 3 | 22.4 |

*Not an example of the invention.
[1]AAm is acrylamide
NaAAm is sodium acrylate
NaAMPS is sodium 2-acrylamide-2-methylpropane sulfonate
All polymer samples are crosslinked with 500 ppm methylene bisacrylamide.
[2]The pH is that of the water sample to which each polymer is added.
[3]Capacity is the amount of water absorbed in grams per gram of polymer.

The data in Table I indicates that examples of the process of this invention (i.e. Sample Nos. 1–6) exhibit superior water holding capacity than those samples which do not contain sodium sulfonate moieties (i.e. Sample Nos. C-1 and C-2) in a very low pH range.

What is claimed is:

1. A process for effectively absorbing water in the form of an aqueous medium having a pH of less than 4 which process comprises:

contacting said aqueous medium with a water-swellable polymer comprising an alkali metal sulfonic acid salt containing polyelectrolyte which is crosslinked in an amount sufficient to provide swellability to said polyelectrolyte, wherein the amount of said sulfonic acid salt moieties in said polyelectrolyte is sufficient to provide water absorbent activity, wherein said sulfonic acid salt containing polyelectrolyte maintains an ionic form over a lower pH range than a swellable polyelectrolyte containing alkali metal carboxylic acid salt moieties having (1) a similar molecular weight and (2) a similar concentration of acid salt moieties to that of said alkali metal sulfonic acid salt polyelectrolyte, and wherein said sulfonic acid salt containing polyelectrolyte provides improved water absorbent capability over a lower pH range than said swellable polyelectrolyte containing alkali metal carboxylic acid salt moieties.

2. A process of claim 1 wherein said aqueous medium has a pH of less than about 3.

3. A process of claim 1 wherein said aqueous medium has a pH of from about 0.2 to about 2.

4. A process of claim 1 wherein said alkali metal sulfonic acid salt containing polyelectrolyte is a copolymer of an essentially nonionic ethylenically unsaturated monomer and an alkali metal salt of an N-sulfoalkyl, α,β-ethylenically unsaturated amide.

5. A process of claim 1 wherein said alkali metal sulfonic acid salt containing polyelectrolyte is a copolymer of a nonionic ethylenically unsaturated monomer, an alkali metal 2-acrylamide-2-methylpropane sulfonate and a polyvinyl crosslinking monomer.

6. A process of claim 1 wherein said water-swellable polymer comprises from 0 to about 95 mole percent essentially nonionic ethylenically unsaturated monomer, from about 5 to about 100 mole percent ethylenically unsaturated monomer containing a sulfonic acid salt moiety, and from about 100 to about 2,500 ppm polyvinyl crosslinking monomer.

7. A process of claim 6 wherein a portion of said essentially nonionic monomer units within the polymer have undergone hydrolysis.

* * * * *